US009530017B2

(12) United States Patent
Fallon et al.

(10) Patent No.: US 9,530,017 B2
(45) Date of Patent: Dec. 27, 2016

(54) SECURE PRINTING BETWEEN PRINTER AND PRINT CLIENT DEVICE

(75) Inventors: Michael F. Fallon, Tiverton, RI (US); Myles Wilde, Charlestown, MA (US); Matthew J. Adiletta, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,867

(22) PCT Filed: Sep. 30, 2011

(86) PCT No.: PCT/US2011/054453
§ 371 (c)(1),
(2), (4) Date: Mar. 14, 2014

(87) PCT Pub. No.: WO2013/048509
PCT Pub. Date: Apr. 4, 2013

(65) Prior Publication Data
US 2014/0185800 A1    Jul. 3, 2014

(51) Int. Cl.
*G06F 21/60* (2013.01)
*G06F 3/12* (2006.01)
*G06K 15/00* (2006.01)
*G06F 21/57* (2013.01)

(52) U.S. Cl.
CPC ........... *G06F 21/608* (2013.01); *G06F 3/1222* (2013.01); *G06F 3/1238* (2013.01); *G06F 21/57* (2013.01); *G06K 15/4095* (2013.01)

(58) Field of Classification Search
CPC .............................. G06F 21/608; G06F 3/1222
USPC .......... 380/55, 277; 713/171, 153, 176, 189, 713/200; 358/1.13, 1.14, 1.15, 1.16, 1.18
See application file for complete search history.

(56) References Cited

U.S. PATENT DOCUMENTS

| 2004/0109568 A1* | 6/2004 | Slick .................... G06F 21/608 380/277 |
| 2005/0097347 A1* | 5/2005 | Josephsen ........... H04L 63/0428 726/26 |
| 2008/0055627 A1* | 3/2008 | Ellis .................... G06F 21/608 358/1.14 |
| 2009/0063857 A1 | 3/2009 | Bade et al. |
| 2010/0070781 A1 | 3/2010 | Bade et al. |
| 2010/0309504 A1 | 12/2010 | Partridge et al. |

(Continued)

FOREIGN PATENT DOCUMENTS

CN          1423206 A      6/2003
JP      H04-220365 A     11/1992
(Continued)

OTHER PUBLICATIONS

Office Action received for Japanese Patent Application No. 2014-533281, mailed on Dec. 16, 2014, 6 pages including 3 pages of English translation.
(Continued)

*Primary Examiner* — Jeffrey Pwu
*Assistant Examiner* — Samuel Ambaye
(74) *Attorney, Agent, or Firm* — Jordan IP Law, LLC

(57) ABSTRACT

Systems and methods of operating a computing system may involve securely printing a print document sent from a client device to a target printer. In one example, the method may include verifying an operating environment of the target printer and generating a plurality of security keys to implement asymmetric encryption of the print document.

24 Claims, 2 Drawing Sheets

(56) References Cited

U.S. PATENT DOCUMENTS

2011/0199643 A1 8/2011 Biundo et al.
2014/0245007 A1 8/2014 Buer et al.

FOREIGN PATENT DOCUMENTS

| | | |
|---|---|---|
| JP | 2007149035 A | 6/2007 |
| JP | 2008-097075 A | 4/2008 |
| JP | 2008097075 A | 4/2008 |
| JP | 2010092472 A | 4/2010 |
| JP | 2011054146 A | 3/2011 |
| KR | 10-2011-0092516 A | 8/2011 |
| TW | 2000604794 A | 2/2006 |
| TW | 2000604798 A | 2/2006 |
| TW | 200635319 A | 10/2006 |
| TW | 2000805970 A | 1/2008 |
| WO | 2013/048509 A1 | 4/2013 |

OTHER PUBLICATIONS

Office Action received for Japanese Patent Application No. 2014-533281, mailed on Apr. 7, 2015, 5 pages including 3 pages of English translation.
International Search Report and Written Opinion received for PCT application No. PCT/US2011/054453, mailed on May 23, 2012, 13 pages.
International Preliminary Report on Patentability and Written Opinion received for PCT Patent Application No. PCT/US2011/054453, mailed on Apr. 10, 2014, 10 Pages.
Notice of Allowance received for Korean Patent Application No. 10-2014-7008434, mailed Aug. 24, 2015, 3 pages including 1 page of English translation.

* cited by examiner

SECURE PRINTING BETWEEN PRINTER AND PRINT CLIENT DEVICE

BACKGROUND

Technical Field

Embodiments generally relate to securely printing from a print client to a target printer. More particularly, embodiments relate to establishing a secure environment to securely print documents.

Discussion

A challenge with printing documents in public settings may be that current processes might not be secure. For example, a print request may be sent through a cloud computing infrastructure before being sent to a target printer. Printing through a cloud may be inherently insecure, as one or more computing components of the cloud may retain access to the user's document. Accordingly, a printer Original Equipment Manufacturer (OEM) may not be able to provide assurances that any document sent to a printer for printing will be handled with complete confidentiality.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
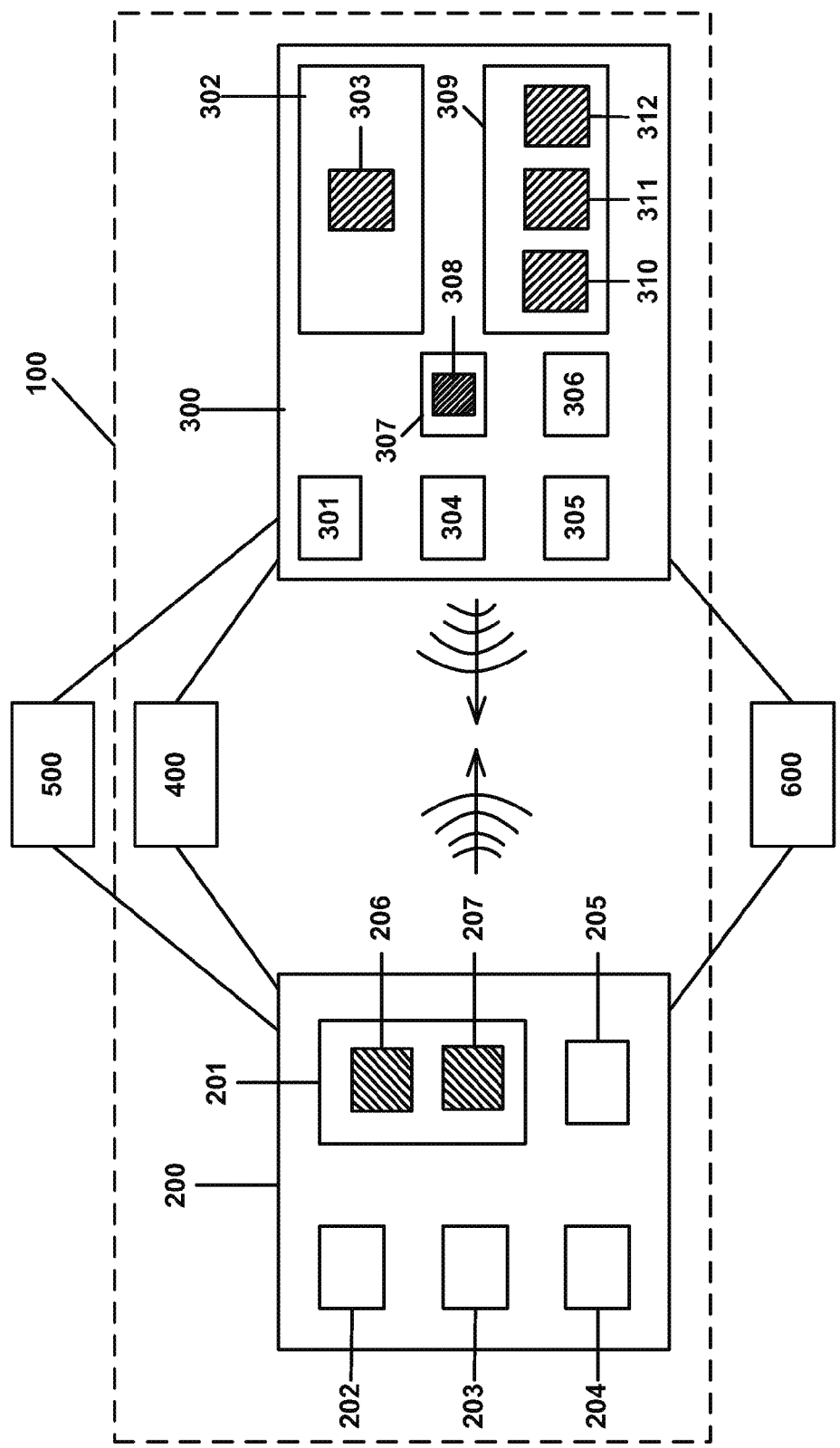
FIG. 1 is a block diagram of an example of a computing system that utilizes a secure printing process in accordance with an embodiment of the invention.

Embodiments may involve a computer implemented method including initializing a printer security hardware component at a target printer, verifying an integrity of an operating environment at the target printer, and receiving a request to print a document at a print client. The method may also provide for generating a plurality of security keys to implement asymmetric encryption of the document, transmitting a first security key of the plurality of security keys to the print client, and conducting an encryption of the document utilizing the first security key. The method may further provide for receiving the document at the target printer in an encrypted form and conducting a decryption of the document utilizing security key of the plurality of security keys.

Embodiments can also involve a computer readable storage medium including a set of instructions, which, if executed by a processor, cause a computer to initialize a printer security hardware component at a target printer, verify an integrity of an operating environment at the target printer, and generate a plurality of security keys to implement asymmetric encryption of the document. The instructions may also cause a computer to transmit a first security key of the plurality of security keys to a print client and decrypt the document utilizing a second security key of the plurality of security keys.

In addition, embodiments may include a printer including a processing component, a security hardware component to verify an operating environment at the target printer, a memory device including a printer-side secure printing application having a set of instructions to be executed by the printer processing component, and a printer-side security logic component to decrypt the document utilizing a second security key of the plurality of security keys. If executed by a processor, the set of instructions may cause a computer to initialize the security hardware component, and generate a plurality of security keys to implement an asymmetric encryption of the document. The instructions may also cause a computer to transmit a first security key of the plurality of security keys to a print client and receive a document in an encrypted form.

Other embodiments can involve a system including a print client, a print server, and a target printer coupled to the print server. The print client may include a client transceiver, a client processing component, a client device memory having a client-side security application, and a client-side security logic component to encrypt a document. The target printer may include a printer processing component, a printer security hardware component to verify an operating environment at the target printer, a printer memory device including a printer-side secure printing application having a set of instructions to be executed by the printer processing component, and a printer-side security logic component to decrypt the document utilizing a second security key of the plurality of security keys. If executed by a processor, the instructions may cause a computer to initialize the printer security hardware component, verify an integrity of an operating environment at the target printer, and generate a plurality of security keys to implement asymmetric encryption of the document. The instructions may also cause a computer to transmit a first security key of the plurality of security keys to the print client and receive the document in an encrypted form.

Turning now to FIG. 1, a block diagram of a computing system 100 including a print client 200 and a target printer 300 is shown. The print client 200 and the target printer 300 may utilize a secure printing process to print a document (hereinafter "document" or "print document") originating from the print client 200. The computer system 100 may also include a print server 400, and may be coupled to a cloud service 500, and a network such as the Internet 601).

The print client 200 may be any electronic device capable of issuing a print request, including a mobile device (e.g., a mobile/smart phone, a personal digital assistant, a tablet device), a notebook computer, or a desktop computer. In the embodiment illustrated in FIG. 1, the print client 200 may be a notebook computer device utilizing the Windows operating system (OS). The print client 200 may include a client device memory 201, a client processing component 202, a client transceiver 203, a client secure printing logic component 204, and a tip client interface 205.

The client device memory 201 may include a memory device that may be used to store data. The client device memory 201 may be built into the print client 200, or may be a removable peripheral storage device (e.g. flash memory), coupled to the client device memory 201. The client device memory 201 may store software applications including computer-readable executable instructions that may be executed by a processing component. For example, the client device memory 201 may include a client-side security application 206 and a print application 207.

The client processing component 202 may include at least one computer processor that executes computer-readable executable instructions. For example, the client-processing component 202 may execute software applications such the client-side security application 206 and the print application 207.

The client transceiver 203 may be a transmitter/receiver that enables the print client 200 to wirelessly communicate with other wirelessly-capable devices (e.g., printer 300). In this embodiment, the print client 200 and the target printer 300 communicate via a Bluetooth protocol (e.g., IEEE 802.15.1-2005, Wireless Personal Area Networks). In other embodiments of the present invention, wireless communication may take place according to other wireless communication protocols (e.g., (e.g., IEEE 802.11, 1999 Edition, LAN/MAN Wireless LANS)).

In addition, the print client 200 may include a client-side security logic component 204. The client-side security logic component 204 may be one or more logic components configured to implement a secure printing process as described herein. Indeed, as will be discussed in greater detail, at least one of the client-side security logic component 204 and the client-side security application 206 may implement at least one of receiving a first key from the target printer 300, using the first key to encrypt a document, and transmitting the encrypted document to the target printer 300.

In addition, the print client 200 may include a client interface 205 to allow a user to interact with the print client 200. The client interface 205 is a notebook display screen displaying a graphical user interface (GUI).

Turning now to the target printer 300, the target printer 300 may include any device coupled to the print client 200 capable of receiving a print request and executing it. In this embodiment, the target printer 300 includes a printer transceiver 301, a printer memory 302, a printer security hardware component 304, a printer processing component 305, a printer-side security logic 306, a printer processing assembly 307, and a printer execution assembly 309.

Similar to the client transceiver 203, the printer transceiver 301 may enable the target irk printer 300 to communicate wirelessly via various wireless communication protocols with other devices, such as the print client 200. In this embodiment, the printer transceiver 301 may enable the target printer 300 to communicate with the print client 200 according to a Bluetooth protocol.

The printer memory 302 may be a memory device that may be used to store data. For example, the printer memory 302 may store printer-side security application 303. As will be discussed in greater detail, the printer-side security application 303 may be a software application that may be executed to implement the secure printing process described herein.

The printer security hardware component 304 may be configured to, among other things, verify the integrity of the operating environment of the target printer 300 and ensure that the target printer 300 is operating in a known and trusted state. For example, immediately upon boot-up, the printer security hardware component 304 may verify, prior to start, the basic input/output system (BIOS). When appropriate, this may be followed by a verification, prior to start, of the operating system (OS). Again, when appropriate, these may be further followed by a verification, prior to start, of any application to be run on the target printer 300. So, for example, in the case of the printer-side security application 303, the printer security hardware component 304 may verify the printer-side security application 303 has not been hacked or modified and ensure that the printer-side security application 303 is operating in a secure and trusted compute environment. In addition, the printer security hardware component 304 may also ensure that no other processes can access the print document during the execution of a printing operation, and restricts access rights to the decrypted document only to the target printer.

The printer processing component 305 may include at least one computer processor to execute computer-readable executable instructions. For example, the printer processing component 305 may be utilized to execute software applications such a printer-side security application 303.

In addition, the target printer 300 may include printer-side security logic 306. The printer-side security logic 306 may be one or more logic components configured to implement a secure printing process as described herein.

As will be discussed in greater detail, at least one of the printer-side security application 303 and the printer-side security logic 306 may utilize, among other things, asymmetric encryption to implement a secure printing process described herein. Such asymmetric encryption may include the generation of a plurality of security keys. The generation of a plurality of security keys may include, for example, randomly generating a pair of security keys (i.e., a first key and a second key).

The pair of security keys may be utilized in conjunction with an encryption specification (e.g., Advanced Encryption Standard (AES)) to encrypt and decrypt a document to be printed. For example, the first ("public") key may be made available to any print client (e.g., print client 200) requesting to print to the target printer 300, and may be utilized to encrypt the print document. On the other hand, the second ("private") key may remain at the target printer and be kept secret, and may be utilized to decrypt the print document. A print document encrypted utilizing the first key may not be decrypting without utilizing the second key.

The printer processing assembly 307 may be an electromechanical apparatus configured to render print requests. The printer execution assembly 307 may include, among other things, a graphics engine 308.

The printer execution assembly 309 may be an electromechanical apparatus configured to execute print requests. The printer execution assembly 309 may include, among other things, a printer head 310, a supporting roller 312, and a document tray 311.

The arrangement and numbering of blocks depicted in FIG. 1 is not intended to imply an order of operations to the exclusion of other possibilities. Those of skill in the art will appreciate that the foregoing systems and methods are susceptible of various modifications and alterations. For example, in the embodiment described in FIG. 1, the printer processing component 304 and the printer-side security logic 306 may be separate, coupled components of the embodiment. However, in other embodiments of the present invention, the elements illustrated in FIG. 1 may be assembled differently. For example, in another embodiment, the printer-side security logic 306 may be built into the printer processing component 304.

Figure 2:
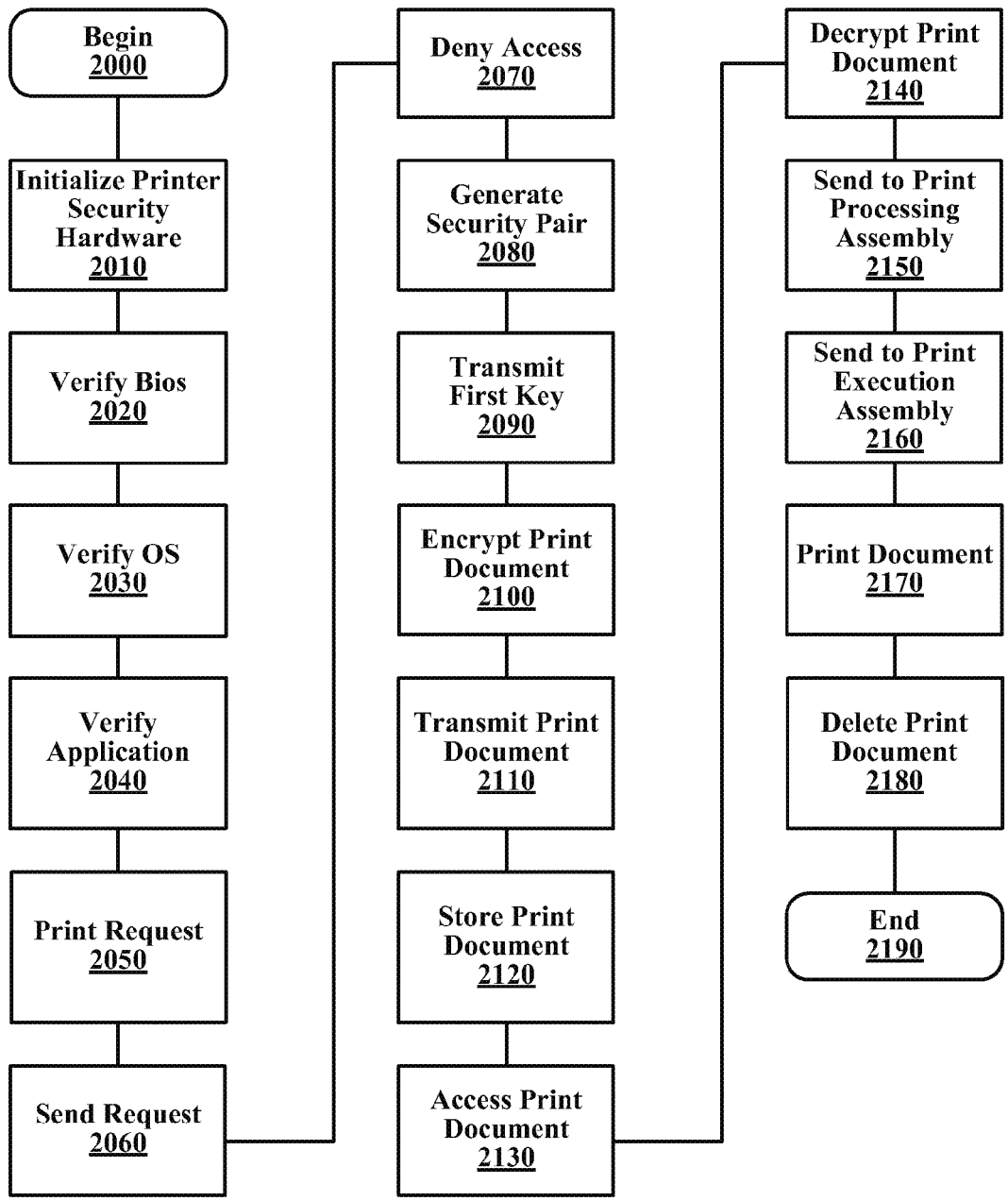
FIG. 2 is a flowchart of an example of a method of secure printing process in accordance with an embodiment of the invention.

Turning now to FIG. 2, a flowchart of an exemplary method of printing according to one embodiment of the present invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

In this example, a user utilizes a notebook computer operating a Windows OS, such as print client 200 (FIG. 1) already discussed, to direct a print request for a print document to a target printer, such as the target printer 300 (FIG. 1) discussed above. Both devices may communicate wirelessly via a protocol such as, for example, the Bluetooth protocol. The method begins at processing block 2000.

At processing block 2010, at boot-up of the target printer, a printer security hardware component, such as the printer security hardware component 305 (FIG. 1) may be initialized. As discussed above, the printer security hardware component may be configured to, among other things, verify the integrity of the operating environment of the target printer, and ensure that the target printer is operating in a known and trusted state. At processing block 2020, the printer security hardware component may verify the integrity of the BIOS, and the BIOS may be started. At processing block 2030, the printer security hardware component may verify the integrity of the OS, and the OS may be started. At processing block 2040, upon the opening of an application, such as print application 207 (FIG. 1), the printer security hardware may verify the integrity of the application, and the print application may be started.

At processing block 2050, a user may initiate the print request. At processing block 2060, the print application may send a print request communication to the target printer. Upon receiving the print request, at processing block 2070, the printer security hardware component 305 may ensure that no other print processes being executed at the target printer can access the print document during execution of the print request.

At processing block 2080, a printer-side security application, such as the printer-side security application 303 (FIG. 1), may randomly generate a unique security pair, including a first key and a second key. At processing block 2090, the first key may be transmitted to the print client. At processing block 2100, the print client may utilize the first key in conjunction with a client-side security logic component, such as the client-side security logic component 204 (FIG. 1), to encrypt the print document. At processing block 2110, the encrypted print document may be transmitted to the target printer.

At processing block 2120, upon receiving the encrypted print document, the target printer may store it in a printer memory, such as the printer memory 302 (FIG. 1). Since the document is stored in its encrypted form, any unauthorized attempt to access the contents of the print document during storage can be rendered fruitless. At processing block 2130, when the target printer is ready to complete the print request, the encrypted print document may be accessed from the printer memory. At processing block 2140, the print document may be decrypted utilizing the second key in conjunction with a printer-side security logic component, such as printer-side security logic component 306 (FIG. 1).

At processing block 2150, the decrypted print document may be sent to a printer to processing assembly, such as printer processing assembly 308 (FIG. 1) immediately after decrypting (i.e., processing block 2140) for print rendering. At processing block 2160, the print document may be sent for printing to a printer execution assembly, such as printer execution assembly 309 (FIG. 1), immediately after print rendering (i.e., processing block 2150).

More specifically, the printer-side security logic component (decryption), the printer processing assembly (rendering), and the printer execution assembly (printing) may be hard-wired components to process continuously without interruption. This may minimize the time the document is available in a decrypted state, thereby minimizing the likelihood of improper access. Furthermore, the print document may be decrypted into a low-level print language primitive that may provide instructions to the printer execution assembly necessary to execute the print request (e.g., instructions to the printer jets, printer rollers, etc.).

At processing block 2170, the printer execution assembly may print the print document. At processing block 2180, any versions (e.g., encrypted, decrypted) of the print document may be deleted from the target printer. At processing block 2190, the process may terminate.

The sequence and numbering of processing blocks depicted in FIG. 2 is not intended to imply an order of operations to the exclusion of other possibilities. Those of skill in the art will appreciate that the foregoing systems and methods are susceptible of various modifications and alterations.

For example, in the embodiment described in FIG. 2, after the print client sends the encrypted print document to the target printer, the print document is stored in encrypted form on the printer memory before printing. However, in other embodiments, the print document may be sent to a print server, such as the printer server 400 (FIG. 1) which may then decrypt the print document, and direct the print document to an available target printer. Also, in the embodiment described in FIG. 2 the target printer randomly generates a unique security pair. However, in other embodiments, the print server may do so. In still other embodiments the encrypted print document may be stored at one or more cloud service devices, such as a device associated with the cloud service 500 (FIG. 1) or elsewhere on a network, such as the Internet 600 (FIG. 1).

It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

Those skilled in the art will appreciate from the foregoing description that the broad techniques of the embodiments of the present invention can be implemented in a variety of forms. Therefore, while the embodiments of this invention have been described in connection to with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections and other components may or may not be shown within the figures, for simplicity of illustration and discussion, and so as not to obscure certain aspects of the embodiments of the invention. Further, arrangements may be shown in processing block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Several features and aspects of embodiments of the present invention have been illustrated and described in detail with reference to particular embodiments by way of example only, and not by way of limitation. Those of skill in the art will appreciate that alternative implementations and various modifications to the disclosed embodiments are within the scope ire and contemplation of the present disclosure. Therefore, it is intended that the invention be considered as limited only by the scope of the appended claims.

We claim:

1. A method comprising:
   initializing a printer security hardware component at a target printer;
   verifying an integrity of an operating environment at the target printer, wherein verifying the integrity of the operating environment includes verifying at least a security application on the target printer;
   receiving a request to print a document at the target printer;
   generating a plurality of security keys to implement asymmetric encryption of the document;
   transmitting a first security key of the plurality of security keys to the print client;
   conducting an encryption of the document utilizing the first security key;
   receiving the document at the target printer in an encrypted form;
   conducting a decryption of the document utilizing a second security key of the plurality of security keys; and
   ensuring, by the printer security hardware component, that no other print processes at the target printer can access the document during execution of the print request, verifying that the printer-side security application is unmodified and ensuring that the printer-side security application is operating in a secure and trusted compute environment.

2. The method claim 1, including:
   rendering the document utilizing a printer processing assembly of the target printer; and
   printing the document utilizing a printer execution assembly of the target printer.

3. The method of claim 1, wherein the decryption of the document is conducted at one of the target printer, a print server, and a cloud service device.

4. The method of claim 1, further including storing the document to a printer memory.

5. The method of claim 4, further including deleting the document from the printer memory.

6. A non-transitory computer readable storage medium comprising a set of instructions, which, if executed by a processor, cause a computer to:
   initialize a printer security hardware component at a target printer;
   verify an integrity of an operating environment at the target printer, wherein verifying the integrity of the operating environment includes verifying at least a security application on the target printer;
   generate a plurality of security keys to implement asymmetric encryption of the document;
   transmit a first security key of the plurality of security keys to a print client; and
   decrypt the document utilizing a second security key of the plurality of security keys; and
   ensure, by the printer security hardware component, that no other print processes at the target printer can access the document during execution of the print request, verify that the printer-side security application is unmodified, and ensure that the printer-side security application is operating in a secure and trusted compute environment.

7. The medium of claim 6, wherein, if executed, the instructions cause a computer to:
   render the document at a printer processing assembly of the target printer; and
   printing the document at a printer execution assembly of the target printer.

8. The medium of claim 6, wherein, if executed, the instructions cause a computer to store the document at a printer memory.

9. The medium of claim 8, wherein, if executed, the instructions cause a computer to delete the document from the printer memory.

10. A printer comprising:
    a processing component;
    a security hardware component to verify an operating environment at the printer, wherein verifying the operating environment includes verifying at least a security application on the target printer, to verify that the security application is unmodified and to ensure that the printer-side security application is operating in a secure and trusted compute environment;
    a memory device including a printer-side secure printing application having a set of instructions to be executed by the processing component, wherein the printer-side secure printing application is to,
    initialize the security hardware component,
    generate a plurality of security keys to implement an asymmetric encryption of the document, transmit a first security key of the plurality of security keys to a print client, and receive a document in an encrypted form; and a printer-side security logic component to decrypt the document utilizing a second security key of the plurality of security keys.

11. The printer of claim 10, including a processing assembly having a graphics engine to render the document.

12. The printer of claim 11, including an execution assembly having a printer head, a supporting roller, and a document tray to print the document.

13. The printer of claim 12, wherein the printer security hardware component, the printer processing assembly, and the printer execution assembly are hardwired components.

14. The printer apparatus of claim 10, wherein the memory device is to store the document.

15. The printer apparatus of claim 14, wherein, if executed, the instructions cause the document to be deleted from the printer memory.

16. The printer apparatus of claim 10, wherein the printer-side security logic component is to decrypt the document into a low-level print language primitive.

17. A system comprising:
a print client including,
  a client transceiver,
  a client processing component,
  a client device memory having a client-side security application, and
  a client-side security logic component to encrypt a document;
a print server; and
a target printer, wherein the target printer includes,
  a printer processing component,
  a printer security hardware component to verify an operating environment at the target printer, wherein verifying the operating environment includes verifying at least a security application on the target printer, to verify that the security application is unmodified and to ensure that the printer-side security application is operating in a secure and trusted compute environment;
  a printer memory device including a printer-side secure printing application having a set of instructions to be executed by the printer processing component, wherein the printer-side secure printing application is configured to,
    initialize the printer security hardware component, wherein the printer security hardware component is to ensure that no other print processes at the target printer can access the document during execution of the print request,
    verify an integrity of the operating environment at the target printer,
    generate a plurality of security keys to implement asymmetric encryption of the document,
    transmit a first security key of the plurality of security keys to the print client, and
    receive the document in an encrypted form, and
  a printer-side security logic component to decrypt the document utilizing a second security key of the plurality of security keys.

18. The system of claim 17, wherein the printer processing component includes a graphics engine to render the document.

19. The system of claim 18, wherein the target printer includes a printer execution assembly having a printer head, a supporting roller, and a document tray to print the document.

20. The system of claim 19, wherein the printer security hardware component, the printer processing assembly, and the printer execution assembly are hardwired components.

21. The system of claim 18, wherein the target printer includes a printer memory to store the document.

22. The system of claim 21, wherein, if executed, the set of instructions cause the apparatus to delete the document from the printer memory.

23. The system of claim 18, wherein the printer-side security logic component is to decrypt the document into a low-level print language primitive.

24. The system of claim 17, wherein the printer security hardware component is to restrict access rights to the decrypted document only to the target printer.

* * * * *

UNITED STATES PATENT AND TRADEMARK OFFICE
CERTIFICATE OF CORRECTION

PATENT NO. : 9,530,017 B2  
APPLICATION NO. : 13/977867  
DATED : December 27, 2016  
INVENTOR(S) : Fallon et al.

Page 1 of 1

It is certified that error appears in the above-identified patent and that said Letters Patent is hereby corrected as shown below:

In the Claims

At Column 8, Claim number 2, Line number 4, after "method", insert -- of --

At Column 8, Claim number 10, Line number 57, delete "target"

Signed and Sealed this
Fourteenth Day of August, 2018

Andrei Iancu
*Director of the United States Patent and Trademark Office*